UNITED STATES PATENT OFFICE 2,439,928

PRODUCTION OF DERIVATIVES OF DIHYDROPYRAN

Peter A. Hawkins, Widnes, and Nicholas Bennett, Ditton, England, assignors to Imperial Chemical Industries Limited, a corporation of Great Britain No Drawing. Application November 7, 1944, Serial No. 562,404. In Great Britain November 19, 1943

4 Claims. (Cl. 260—333)

This invention relates to the production of organic compounds and more particularly to the production of derivatives of dihydropyran.

In copending U. S. application Serial No. 562,401 there is described the production of chlorinated derivatives of a hydropyran by reacting a hydropyran with chlorine, optionally in the presence of a solvent for the hydropyran. Thus 3-chloro-5,6-dihydropyran can be obtained by chlorinating dihydropyran until approximately 2 atoms of chlorine per molecule have combined with the dihydropyran and then eliminating hydrogen chloride by distillation at ordinary pressures. There is further described the production of 2-hydroxy-3-chlorotetrahydropyran by treating the crude reaction product containing approximately 2 atoms of chlorine per molecule of dihydropyran with water, suitably in the presence of a base, for example calcium carbonate, present in suspension. Small amounts of the ether theoretically derived from the hydroxy derivative by elimination of the elements of water were also present in the reaction product.

According to the present invention substantial yields of a chlorotetrahydropyran ether are obtained by a process which comprises reacting 2-hydroxy-3-chlorotetrahydropyran with dihydropyran or with a chloro derivative thereof. Advantageously the reaction is carried out in the presence of hydrogen chloride.

The existence of three dihydropyrans can be postulated on purely valence considerations, but so far as we are aware only one has been prepared, namely dihydro-γ-pyran. It is to be understood that in the present specification and claims references to dihydropyran and derivatives thereof are references to dihydro-γ-pyran and its derivatives.

In one form of the invention reaction between 3-chloro - 5,6 - dihydropyran and 2-hydroxy-3-chlorotetrahydropyran is brought about by causing the two compounds to react with formation of bis(3-chlorotetrahydropyran)-2-ether, in accordance with the equation:

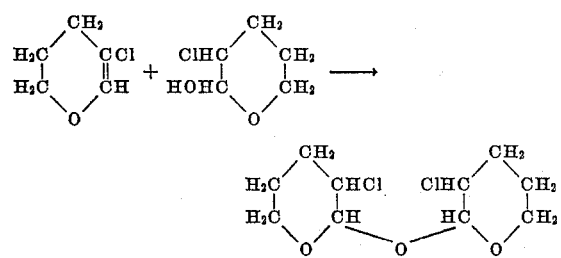

The reaction will take place if the two reactants are merely mixed together in a pure state at ordinary temperature. Reaction is, however, slow and it is preferred to promote the reaction by having hydrogen chloride present in the mixture of the two reactants. The 3-chloro-5,6-dihydropyran is a liquid at ordinary temperatures, and thus the reaction may be brought about by adding the second reactant to it, whereupon solution of the latter in the former takes place, and then passing gaseous hydrogen chloride into the resultant solution. The two reactants may be mixed in approximately equivalent amounts, warming, if necessary, to effect solution, or an excess of the liquid reactant may be used so as to dissolve the second reactant without heating. After the solution has been saturated with hydrogen chloride it may be allowed to stand for a time, for example 24 hours. The desired ether compound is then gradually formed, and separates as crystals which may be isolated by filtration, and recrystallized from a suitable solvent such as water, or a lower aliphatic alcohol, for example methanol, ethanol, propanol, or isopropanol. It is also possible to prepare the ether compound by using the crude chlorodihydropyran obtained as in the copending application referred to above. The crude chlorodihydropyran then usually contains sufficient hydrogen chloride to function as a condensing agent in the preparation of the ether and the further addition of a condensing agent is not necessary.

Instead of reacting the 2-hydroxy-3-chlorotetrahydropyran with 3-chloro-5,6-dihydropyran it may be reacted in a similar manner with dihydropyran itself, or with a more highly chlorinated dihydropyran.

The following examples illustrate but do not limit the invention, all parts being parts by weight.

Example 1

120 parts of 2-hydroxy-3-chlorotetrahydropyran were mixed with 140 parts of crude 3-chloro-5,6-dihydropyran with agitation. Solution of the latter in the former occurred, and a crop of crystals separated which converted the mixture into a thick mush. The crystals were filtered on a vacuum filter, and recrystallized from ethyl alcohol. 195 parts of bis-(3-chlorotetrahydropyran)-2-ether were thus obtained. The recrystallized material had a molecular weight of 255 and a chlorine content of 29.4%; $(C_5H_8ClO)_2O$ has a molecular weight of 255 and a chlorine content of 29.2%. The chlorine in the compound resisted hydrolysis by hot water, and the compound did not react with alcoholic potash, sodium ethoxide or with the sodio derivative of diethyl malonate. The compound melted at 107° C.

Example 2

26 parts of 3-chloro-2-hydroxytetrahydropyran were dissolved in 22 parts of 3-chloro-5,6-dihydropyran, and the resulting solution was saturated with hydrogen chloride at room temperatures. The solution was left for 23 hours, by which time it had become almost solid as the result of the deposition of bis-(3-chlorotetrahydropyran)-2-ether. The product was then filtered off after adding a small amount of ethyl alcohol to facilitate filtration. 22 parts of bis-(3-chlorotetrahydropyran)-2-ether were obtained melting at 105° C. to 107° C.

Example 3

37 parts of 3-chloro-2-hydroxytetrahydropyran were dissolved in 30 parts of dihydropyran with warming, and the mixture was saturated with hydrogen chloride; considerable heat was evolved. The reaction mixture was allowed to stand until cold, and was then poured into water and the resulting solution extracted with ethyl ether. The ethereal extract was first washed with aqueous sodium carbonate and then with water, dried over anhydrous calcium chloride, and the ethyl ether evaporated off. On distillation in vacuo 42 parts of product were obtained boiling in the range 115° C. to 121° C./2.5 mm. and having a specific gravity $$D_4^{23}\ 1.187$$

a refractive index $n^{25}=1.476$, and a chlorine content of 16.8%.

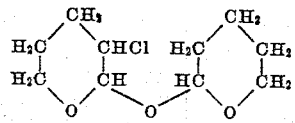

requires 16.1% chlorine.

We claim:
1. A process for the production of a chloroditetrahydropyran ether which comprises reacting 2-hydroxy-3-chlorotetrahydropyran with a substance selected from the group consisting of dihydropyran and 3-chlorodihydropyran in the presence of hydrogen chloride.

2. A process for the production of a chloroditetrahydropyran ether which comprises mixing 2-hydroxy-3-chlorotetrahydropyran with a substance selected from the group consisting of dihydropyran and 3-chlorodihydropyran, saturating the resulting mixture at atmospheric temperature with gaseous hydrogen chloride, and subsequently separating the resultant chloroditetrahydropyran ether from the reaction product.

3. A process for the production of chloroditetrahydropyran ether which comprises mixing 2-hydroxy-3-chlorotetrahydropyran with approximately an equivalent amount of dihydropyran, saturating the resulting mixture at atmospheric temperature with gaseous hydrogen chloride, and subsequently isolating the resulting chloroditetrahydropyran ether from the reaction product.

4. A process for the production of bis-(3-chlorotetrahydropyran)-2-ether which comprises mixing 2-hydroxy-3-chloroterahydropyran with approximately an equivalent amount of 3-chloro-5,6-dihydropyran, saturating the resulting mixture at atmospheric temperature with gaseous hydrogen chloride, and subsequently isolating the resulting bis-(3-chlorotetrahydropyran)-2-ether from the reaction product.

PETER A. HAWKINS.
NICHOLAS BENNETT.

REFERENCES CITED

The following references are of record in the file of this patent:

Chemical Abstracts, vol. 20 (1926), page 1624.
Bull. Soc. Chimique (5), 1, pp. 1397–1405 (1934); ibid., page 980 (1934).
Compte Rend., 198, pages 375–6 (1934).

Certificate of Correction

Patent No. 2,439,928. April 20, 1948.

PETER A. HAWKINS ET AL.

It is hereby certified that errors appear in the printed specification of the above numbered patent requiring correction as follows: Column 4, line 17, claim 3, before "chloroditetrahydropyran" insert *a*; line 28, claim 4, for "2-hydroxy-3-chloroterahydropyran" read *2-hydroxy-3-chlorotetrahydropyran*; and that the said Letters Patent should be read with these corrections therein that the same may conform to the record of the case in the Patent Office.

Signed and sealed this 6th day of July, A. D. 1948.

[SEAL]

THOMAS F. MURPHY,
*Assistant Commissioner of Patents.*